O. WILSON.
COOKING STOVE GRATE.
9541X
Patented Mar. 23, 1836.
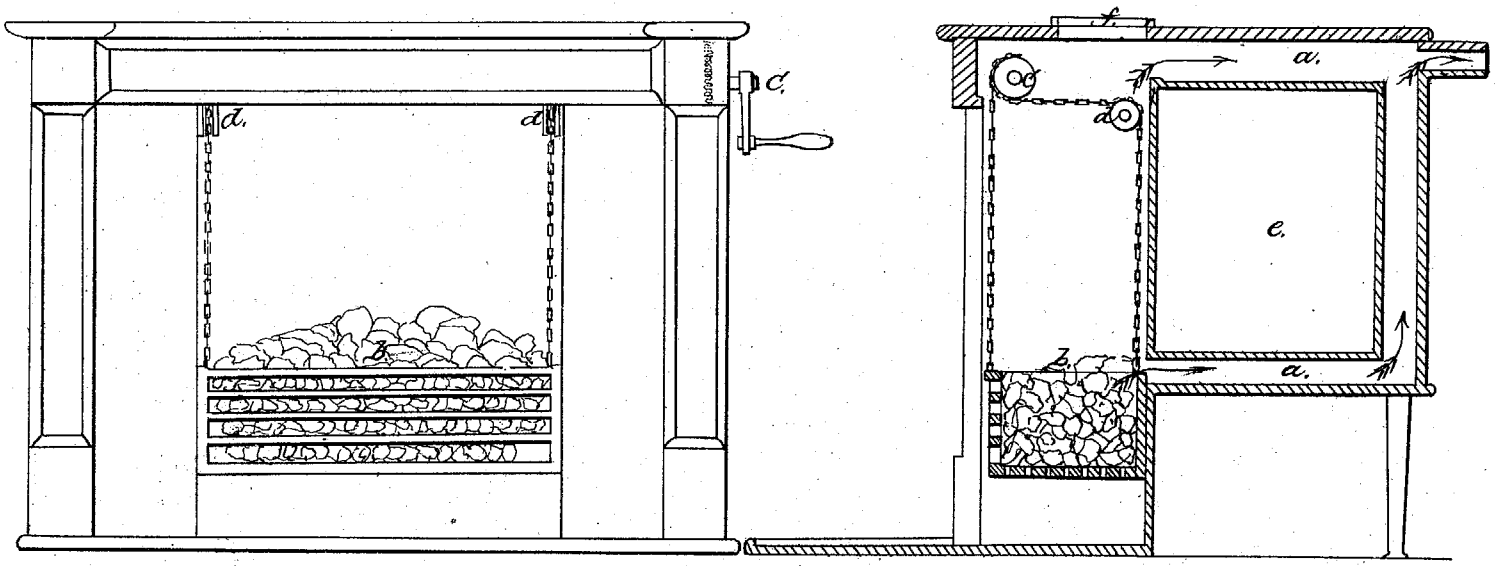

9541X
Mar. 23. 1836 2

Orin Wilson, of Concord, Mss:
Letters Patent

The schedule referred to in these Letters Patent, and making part of the same containing a description in the words of the said Orin Wilson himself, of his improvement in the Cooking Stove grate and its appendages, applicable to other stoves fireplaces &c.

---

To all whom these presents shall come: Be it known that I, Orin Wilson of Concord, County of Middlesex, and State of Massachusetts, have invented a new and useful improvement in the Cooking Stove grate and its appendages, the same being applicable to other stoves fire frames & fire places, and that the following is a full and exact description thereof.

Material - The stove fire frame, fireplace and grate, may be made of any convenient form and suitable material. The parts containing the boilers, oven dampers, and flues, may be constructed after any approved pattern to which the moveable grate hereinafter to be described can be adapted with its appendages - Structure of fire place - The front of the stove is so constructed as to form an open fire place or fire frame of any size required, and may be attached to the stove by screws and bolts or (if of metal cast or made in connexion with the other parts as convenience may require - An aperture is made in the back part or plate of the fire frame (which is the front of the stove) at a suitable distance from the hearth to admit the heat or smoke from the grate beneath (when resting on the hearth) into the stove, underneath and near the cap or top of the frame which may be of the same piece and equal heigth with the top of the stove is another aperture to admit the heat and smoke into the stove - Grate. A grate or pan to contain the wood or coal is made in form and size adapted to the fire place or frame, the bottom of the grate is perforated to promote the circulation of air and separate the ashes: the front of the pan is guarded with bars of metal, in the usual manner to prevent the fire coals from falling off the grate, the sides and back of the grate are made close in the form of the sides of a disk or pan - (Cylinder) behind and near to the frontispiece or front plate at the top of the frame is a cylinder equal in length with the grate aforedescribed.
The axle of the cylinder has its bearings in the sides of the frame - one end of the
axle is extended through the side of the frame far enough to receive a ratchet
to hold it, in any position required, and a crank by which the cylinder is turned
around - (Chains) four chains (two at each end) are attached to the cylinder:
two of which extend in a perpendicular line from and beneath the front line
of the periphery of the cylinder to the front corners of the grate to which they are
attached - The length of each of the other chains exceeds the pair first mentioned
by the width of the width of the grate or pan: from the cylinder they pass in a
horizontal direction into the back part of the frame, thence over two pulleys
downward in a perpendicular line to the back part of the grate or pan to
which they are also attached - Operation - by turning the crank the chains
are wound on or off the cylinder and the grate consequently elevated or depress-
ed as the case may require - Advantages, when it is required to have the
benefit of an open fire, the grate is made to descend low enough to admit the
passage of the smoke through the lower aperture in the back part of the plate
or frame afore described - Dampers may be applied to throw the surplus heat
into the flue or around the oven boilers &c. as circumstances may require
The grate may be so elevated as to close the lower aperture, or leave it
beneath the grate or pan, in which position the smoke & heat ascend a part
passing over the top of the back plate of the frame, through the top of the stove
or flue (as the case may be) into the chimney and a part is thrown out into
the room - Operation continued, When it is required to heat the room
less and the boiler, and oven of the stove more the grate is elevated to its
highest point, the dampers being adjusted to facilitate the operations, the
fire is thereby brought in closed contact with the boilers, and oven, while
the front part or frame is cooled and the atmosphere in the room less heated
than it is by other methods in other stoves in common use -
Claim. What I claim as my own invention and not heretofore known
or used is the moveable grate or pan whether operated with chains and
pulleys, rack and pinion or other mechanical powers: The peculiar
adaptation and arrangement and combination of the several parts of the
stove, fire frame or fire place to the said moveable grate for the use

9541X

254 and purposes herein described and set forth —

Witnesses

Isaac Miller

Andrew Barr

Orin Wilson

Drawing made 960 acres

Exd
HGC